(12) United States Patent  
Baccouche et al.

(10) Patent No.: US 10,124,833 B2
(45) Date of Patent: Nov. 13, 2018

(54) B-PILLAR ASSEMBLY FOR VEHICLE BODY

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 15/254,446

(22) Filed: Sep. 1, 2016

(65) Prior Publication Data

US 2018/0057066 A1    Mar. 1, 2018

(51) Int. Cl.
*B62D 25/04* (2006.01)
*B62D 29/04* (2006.01)

(52) U.S. Cl.
CPC ........... *B62D 25/04* (2013.01); *B62D 29/043* (2013.01)

(58) Field of Classification Search
CPC ...... B62D 21/15; B62D 21/157; B62D 25/04; B62D 25/00; B62D 29/00; B62D 29/001; B62D 29/005; B62D 29/007; B62D 29/04; Y10T 29/49622
See application file for complete search history.

(56) References Cited

U.S. PATENT DOCUMENTS

| | | | | |
|---|---|---|---|---|
| 5,246,264 A * | 9/1993 | Yoshii | ............... | B62D 25/04 296/1.03 |
| 6,296,301 B1 * | 10/2001 | Schroeder | ............ | B62D 29/046 296/187.02 |
| 8,029,047 B2 * | 10/2011 | Kim | ............... | B62D 25/04 296/187.12 |
| 8,491,047 B1 * | 7/2013 | Moll | ............... | B62D 25/04 296/193.06 |
| 9,090,287 B2 | 7/2015 | Ezzat et al. | | |
| 9,580,111 B1 * | 2/2017 | Caliskan | ............... | B62D 29/043 |
| 9,630,651 B1 * | 4/2017 | Baccouche | ............ | B62D 29/005 |
| 9,744,998 B2 * | 8/2017 | Inamoto | ............... | B62D 25/04 |
| 9,969,434 B2 * | 5/2018 | Baccouche | ............ | B62D 27/023 |
| 9,975,578 B2 * | 5/2018 | Akhlaque-E-Rasul | ............... | B62D 21/157 |
| 2008/0001434 A1 * | 1/2008 | Henkelmann | ............ | B62D 25/04 296/187.12 |
| 2010/0327630 A1 * | 12/2010 | Klimek | ............... | B62D 25/02 296/203.03 |

(Continued)

FOREIGN PATENT DOCUMENTS

EP     2392504 B1    6/2013

*Primary Examiner* — Hilary L Gutman
(74) *Attorney, Agent, or Firm* — Jason C. Rogers; Brooks Kushman P.C.

(57) ABSTRACT

A vehicle B-pillar assembly is provided. The vehicle B-pillar assembly includes a steel T-bracket and a B-pillar outer assembly. The steel T-bracket includes an upper portion secured to a roof rail and a lower portion extending perpendicular therefrom and below a beltline. The B-pillar outer assembly includes an upper carbon fiber portion extending from the roof rail to a location above the beltline and a lower steel portion extending from a vehicle rocker to a location above the beltline and secured to the lower portion of the T-bracket. The beltline may be defined by an axis extending between a shotgun joint on a vehicle A-pillar and a latch reinforcement on a vehicle C-pillar. The beltline may extend fore and aft along the vehicle and through a substantially central region of the B-pillar assembly.

19 Claims, 5 Drawing Sheets

(56) References Cited

U.S. PATENT DOCUMENTS

2014/0191536 A1    7/2014  Elfwing et al.
2017/0073017 A1*  3/2017  Steffens ................. B62D 29/00
2017/0327157 A1*  11/2017  Jaunasse ............. B62D 29/004
2018/0118279 A1*  5/2018  Lee ...................... B62D 21/157

* cited by examiner

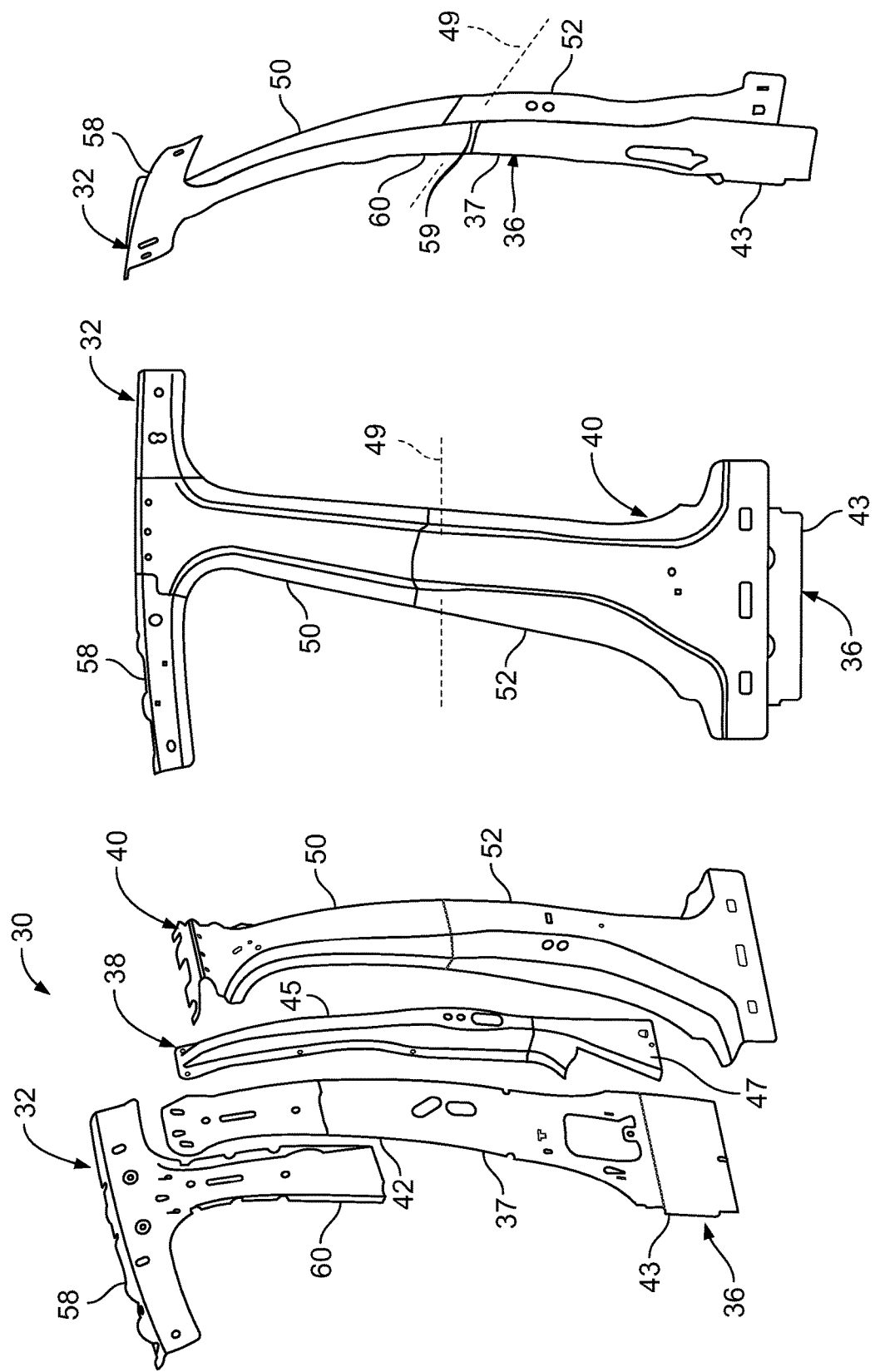

B-PILLAR ASSEMBLY FOR VEHICLE BODY

TECHNICAL FIELD

This disclosure relates to structural reinforcement components for B-pillar assemblies of vehicles.

BACKGROUND

B-pillar assemblies of automotive vehicles are tested for performance under impacts, such as a side impact test and a roof crush test. The B-pillar assemblies may have various components made of various materials. For example, the components may be of steel or carbon fiber. Carbon fiber components typically weigh less than steel components and as such may provide for improved vehicle fuel economy. Difficulties may arise when carbon fiber is used for components that are typically made of steel. A lack of ductility in the carbon fiber components may prevent desired deformation performance of the B-pillar assembly during the side or roof crush impacts.

This disclosure is directed to solving the above problems and other problems as summarized below.

SUMMARY

According to an aspect of the present disclosure, a B-pillar assembly for a vehicle includes a roof rail, a T-bracket, a B-pillar inner, a B-pillar inner reinforcement, and a multi-component B-pillar outer. The T-bracket includes a first portion sized for securing to the roof rail and a second portion extending from the first portion to a location below a vehicle beltline. The B-pillar inner includes a first end for securing to the second portion and a second end for securing to a rocker. The B-pillar inner reinforcement is mounting to the B-pillar inner. The multi-component B-pillar outer includes a carbon fiber portion and a steel portion mounted to the T-bracket, the roof rail, and the rocker such that the B-pillar inner reinforcement is disposed between the B-pillar inner and the B-pillar outer, and such that the steel portion of the B-pillar outer extends from the rocker to a location above the vehicle beltline. The second portion of the T-bracket is secured to the steel portion of the B-pillar outer below the vehicle beltline. The vehicle beltline may extend fore and aft along the vehicle and through a substantially central region of the B-pillar assembly. The vehicle beltline may be defined by an axis extending between a shotgun joint on a vehicle A-pillar and a latch reinforcement on a vehicle C-pillar. An upper portion and a lower portion of the B-pillar inner may each define a first thickness and a middle portion of the B-pillar inner may define a second thickness greater than the first thickness. The upper portion and the middle portion may meet at a location adjacent the vehicle beltline. The B-pillar inner reinforcement may include an upper carbon fiber portion defining a first thickness and a lower carbon fiber portion defining a second thickness greater than the first thickness. The carbon fiber portion of the B-pillar outer may be oriented between the roof rail and steel portion of the B-pillar outer to provide stiffness to the B-pillar assembly under a side impact.

According to another aspect of the present disclosure, a vehicle B-pillar assembly includes T-bracket, a carbon fiber B-pillar inner, a B-pillar reinforcement, an upper B-pillar outer, and a lower B-pillar outer. The T-bracket includes an upper portion for securing to a vehicle roof rail and a lower portion extending perpendicular from the upper portion and below a vehicle beltline. The carbon fiber B-pillar inner is secured to the T-bracket at one end and secured to a vehicle rocker at another end. The B-pillar reinforcement is secured to the B-pillar inner. The upper B-pillar outer includes an upper portion for securing to the upper portion of the T-bracket and a lower portion extending to a location above the vehicle beltline. The lower B-pillar outer includes an upper portion extending to a location above the vehicle beltline and secured to the lower portion of the T-bracket and further including a lower portion secured to the vehicle rocker. The lower portion of the T-bracket and the lower B-pillar outer are steel and secured to one another to provide a steel reinforcement member spanning from the vehicle roof rail to the vehicle rocker. The vehicle beltline may be defined by an axis extending between a shotgun joint on a vehicle A-pillar and a latch reinforcement on a vehicle C-pillar. The vehicle beltline may extend fore and aft along the vehicle and through a substantially central region of the B-pillar assembly. The lower portion of the T-bracket and the lower B-pillar outer may be arranged with one another for welding therebetween. The lower portion of the T-bracket and the lower B-pillar outer may be secured to one another at a location adjacent the vehicle beltline. The upper B-pillar outer may define a thickness between 3.7 mm and 4.1 mm. The lower portion of the T-bracket and the lower B-pillar outer may define ductile hinging zones under a roof impact load and the upper B-pillar outer and the lower B-pillar inner may define stiffness zones under a side impact load applied to the B-pillar assembly.

According to a further aspect of the present disclosure, a vehicle B-pillar assembly includes a steel T-bracket and a B-pillar outer assembly. The steel T-bracket includes an upper portion secured to a roof rail and a lower portion extending perpendicular therefrom and below a beltline. The B-pillar outer assembly includes an upper carbon fiber portion extending from the roof rail to a location above the beltline and a lower steel portion extending from a vehicle rocker to a location above the beltline and secured to the lower portion of the T-bracket. The beltline may be defined by an axis extending between a shotgun joint on a vehicle A-pillar and a latch reinforcement on a vehicle C-pillar. The beltline may extend fore and aft along the vehicle and through a substantially central region of the B-pillar assembly. The lower portion of the T-bracket and the lower portion of the B-pillar outer may be secured to one another at a location adjacent the beltline. The upper carbon fiber portion may define a thickness between 3.7 mm and 4.1 mm. The lower portion of the T-bracket and the lower steel portion of the B-pillar outer assembly may define ductile hinging zones under a roof impact load and the upper carbon fiber portion of the B-pillar outer assembly and a carbon fiber B-pillar inner may define stiffness zones under a side impact load applied to the B-pillar assembly.

BRIEF DESCRIPTION OF THE DRAWINGS

FIG. 2 is an exploded view of an example of a B-pillar assembly of the vehicle body of FIG. 1.

FIG. 3 is a side view of the B-pillar assembly of FIG. 2 shown assembled.

FIG. 4 is a front perspective view of the B-pillar assembly of FIG. 2.

DETAILED DESCRIPTION

Embodiments of the present disclosure are described herein. It is to be understood, however, that the disclosed embodiments are merely examples and other embodiments can take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
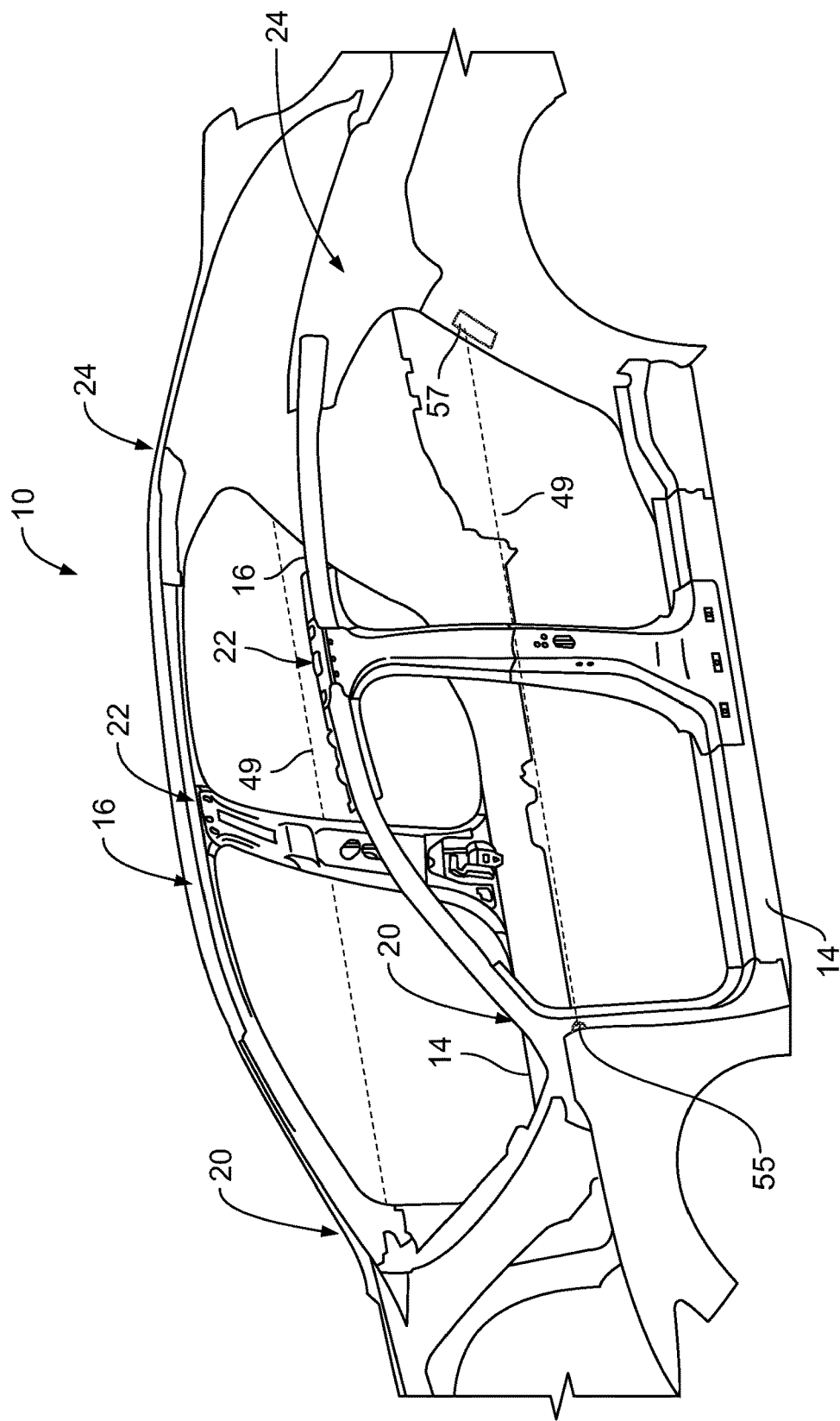
FIG. 1 is fragmentary a perspective view of an example of a vehicle body.

FIG. 1 illustrates an example of a portion of a vehicle body referred to generally as a vehicle body 10 herein. The vehicle body 10 includes rocker panels 14 spaced from roof rails 16. Pillars extend between the rocker panels 14 and the roof rails 16. For example, the vehicle body 10 includes A-pillars 20, B-pillars 22, and C-pillars 24. The A-pillars 20 are spaced from one another and partially define an opening for a front windshield. The A-pillars 20, the B-pillars 22, the rocker panels 14, and the roof rails 16 define an opening for a front door. The B-pillars 22, the C-pillars 24, the rocker panels 14, and the roof rails 16 define an opening for a rear door.

FIGS. 2 through 4 illustrate an example of components of a B-pillar assembly. Two B-pillar assemblies 30 are mounted to the vehicle body 10 at the B-pillars 22. Each of the B-pillar assemblies 30 includes a T-bracket 32, a B-pillar inner 36, a B-pillar reinforcement 38, and a B-pillar outer 40. The T-bracket 32 and the B-pillar outer 40 may be made of a material having high ductility characteristics, such as boron steel. The B-pillar inner 36 and the B-pillar reinforcement 38 may be made of a material including low ductility characteristics, such as carbon fiber. The B-pillar inner 36 includes an upper end 42 for securing to the T-bracket 32, a lower end 43 for securing to the rocker panel 14, and a middle portion 37. The upper end 42 and the middle portion 37 meet at a location adjacent a vehicle beltline 49. The upper end 42 and the lower end 43 may define a first thickness and the middle portion 37 may define a second thickness greater than the first thickness. For example, the upper end 42 and the lower end 43 may define a thickness between 3.7 mm and 4.1 mm and the middle portion 37 may define a thickness between 5.0 mm and 5.4 mm.

The B-pillar reinforcement 38 includes an upper end 45 and a lower end 47. The upper end 45 defines a third thickness and the lower end 47 defines a fourth thickness. For example, the upper end 45 of the B-pillar reinforcement 38 may define a thickness between 3.7 mm and 4.1 mm and the lower end 47 of the B-pillar reinforcement 38 may define a thickness between 2.4 mm and 2.8 mm. The B-pillar reinforcement 38 may define a substantially U-shaped profile adapted to be inserted within a corresponding shape of the B-pillar outer 40.

The B-pillar outer 40 may comprise two components or be a single component. For example, the B-pillar outer 40 may be comprised of a first member 50 and a second member 52 secured to one another or secured to the B-pillar inner 36. The first member 50 may be of a carbon fiber material and the second member 52 may be of a boron steel material. The first member 50 may define a fifth thickness and the second member 52 may define a sixth thickness. For example, the fifth thickness may be between 3.7 mm and 4.1 mm and the sixth thickness may be between 1.6 mm and 2.0 mm. The first member 50 and the second member 52 meet one another substantially at a beltline 49 of the vehicle body 10. The beltline 49 of the vehicle body 10 may be defined as a location extending fore to aft along the vehicle body 10 located midway between the rocker panels 14 and the roof rails 16, or midway between an upper end and a lower end of the B-pillar outer 40. For example, the beltline 49 may extend between a hinge pillar at a shotgun joint 55 on the A-pillar 20 and a door latch reinforcement 57 on the C-pillar 24. The beltline 49 of the vehicle body 10 may extend along a location of an upper edge of a window opening of a front or rear door (not shown).

The T-bracket 32 includes an upper end 58 for securing to one of the roof rails 16 and a lower end 60. The lower end 60 extends perpendicularly from the upper end 58. The B-pillar inner 36 and the B-pillar outer 40 are both mounted to the T-bracket 32. For example, the components of the B-pillar assembly are arranged with one another so the T-bracket 32 and the B-pillar outer 40 may be rigidly secured to one another. Continuing to refer to FIG. 4, the lower end 60 of the T-bracket 32 may be joined, such as via a welding process, to the second member 52 of the B-pillar outer 40 at edges 59. Fixedly securing the T-bracket 32 to the B-pillar outer 40 provides a continuous steel member extending from the roof rails 16 to the rocker panels 14. As illustrated in FIG. 4, the steel T-bracket 32 and the steel second member 52 overlap one another relative to the beltline 49 and the carbon fiber first member 50 of the B-pillar outer 40 and the carbon fiber middle portion 37 of the B-pillar inner 36 are offset from one another.

Figure 6:
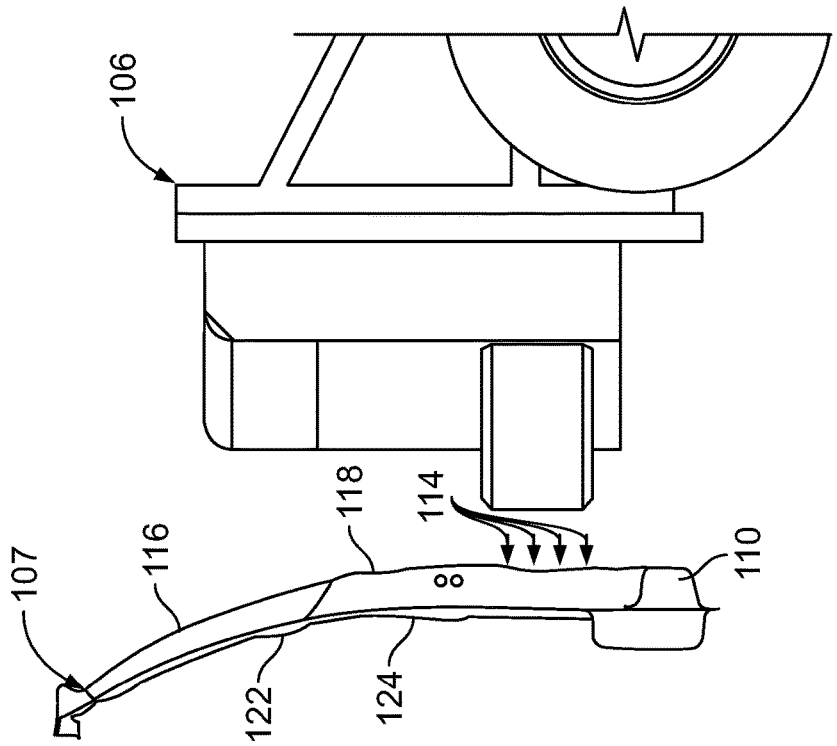
FIG. 6 is a front view of FIG. 5 illustrating an example of a B-pillar assembly prior to receiving a side impact.
Figure 5:
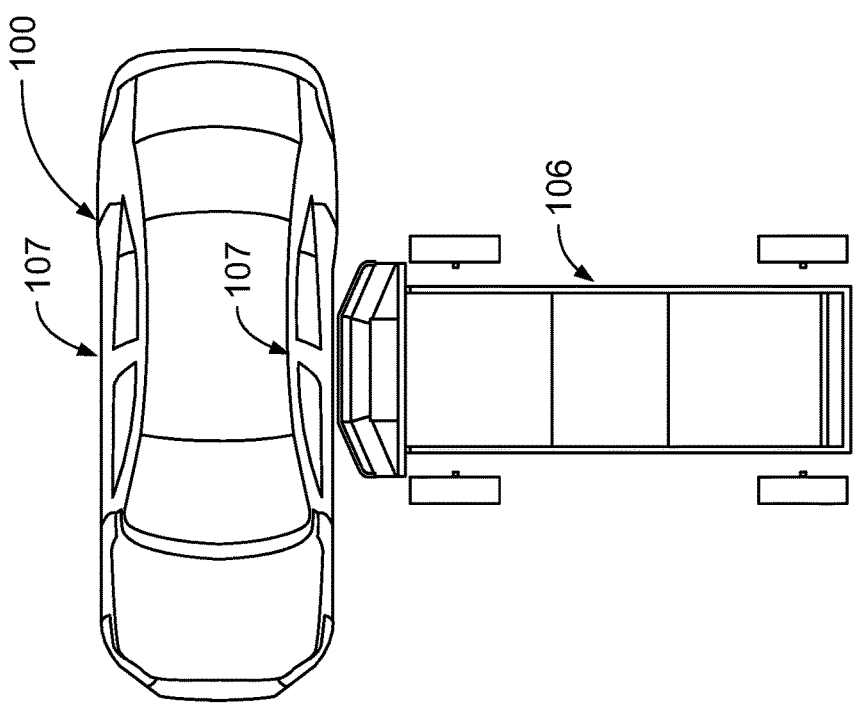
FIG. 5 is a top view of an example of a setup for a side impact crash test including an impact sled and vehicle.
Figure 7:
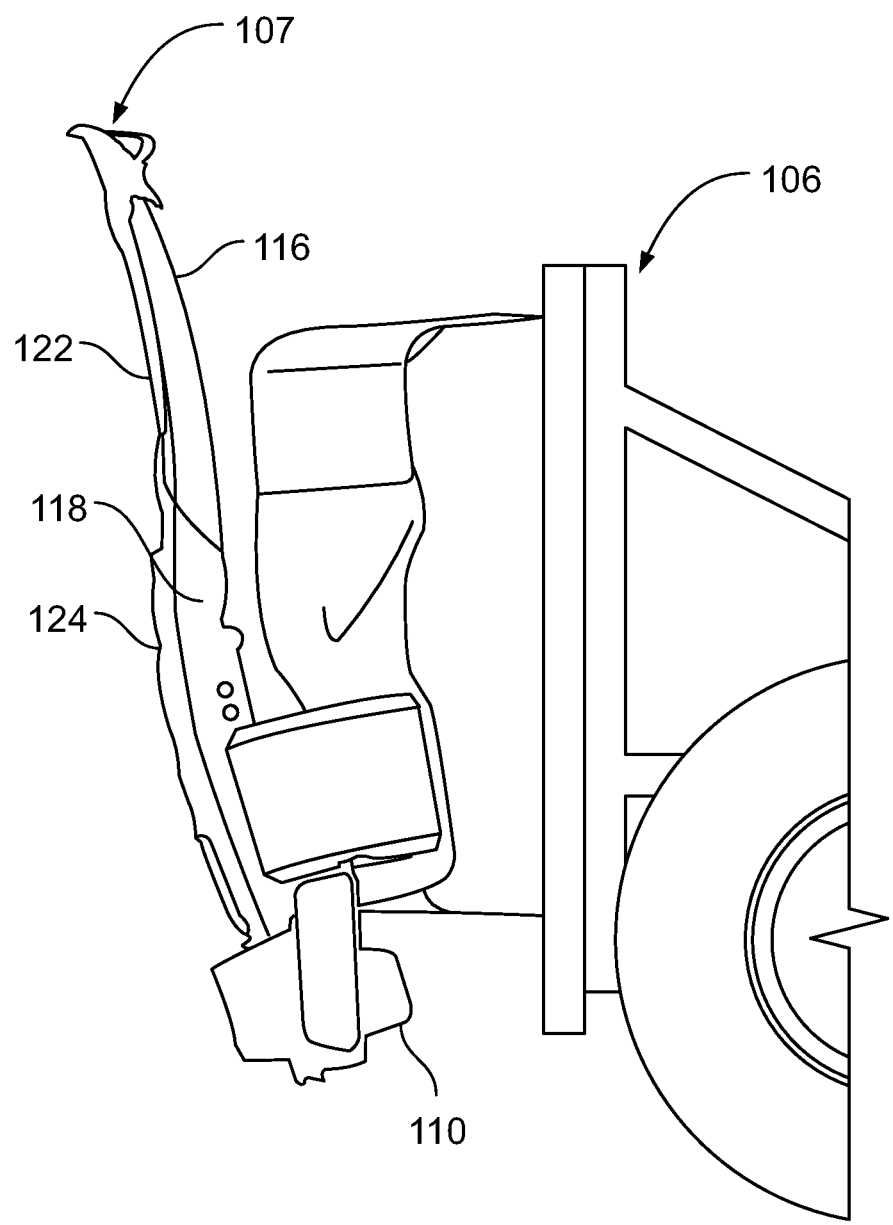
FIG. 7 is a front view illustrating the B-pillar assembly of FIG. 5 after receiving a side impact.

As described above, the structure of the B-pillar assembly assists in providing rigidity to the vehicle body 10 when subject to an impact. FIG. 5 is a top view illustrating a portion of an Insurance Institute for Highway Safety (IIHS) side impact crash test and shows a vehicle 100 with a test sled 106. The vehicle 100 includes B-pillar assemblies 107. FIG. 6 is a front view illustrating a portion of the side impact crash test. In this example, the test sled 106 is propelled toward the vehicle 100. The test sled 106 and the vehicle 100 are arranged with one another such that the test sled 106 contacts the vehicle 100 at the B-pillar assembly 107 above a rocker 110 as represented by force arrows 114. Each B-pillar assembly 107 includes a B-pillar outer having a first member 116 and a second member 118. The B-pillar assembly 107 includes a T-bracket 122 and a B-pillar inner 124. The first member 118 of the B-pillar outer may be of a carbon fiber material to assist in providing stiffness to the B-pillar assembly 107. The T-bracket 122 and the second member 118 of the B-pillar outer may be of a steel material and are secured to one another to provide a fixed continuous steel reinforcement linkage spanning from a roof rail to the rocker panel 110. The steel reinforcement may assist in providing a ductile first hinging zone within the T-bracket 122 under a load applied via a roof impact and a second hinging zone within the second member 118 under a load applied via a side impact. FIG. 7 illustrates a front view of the B-pillar assembly 107 following the side impact from the test sled 106.

Figure 8:
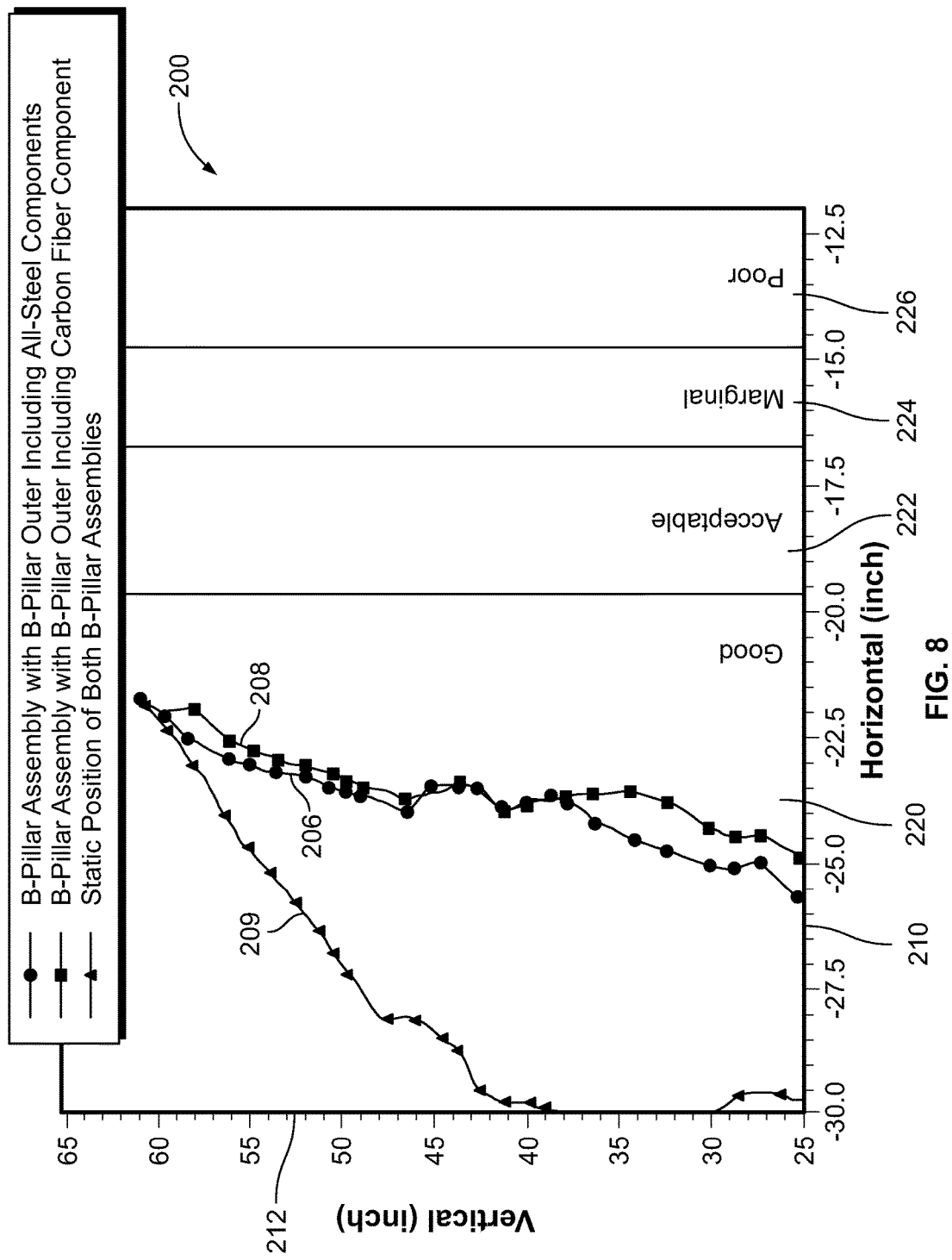
FIG. 8 is a graph illustrating a performance comparison of two B-pillar assemblies subjected to a side impact crash test.

FIG. 8 is a graph comparing two B-pillar assemblies during a model of the IIHS side impact test, referred to generally as a graph 200 herein. A first plot 206 represents a performance of a B-pillar assembly including an all steel B-pillar outer. A second plot 208 represents a performance of a B-pillar assembly including a B-pillar outer comprising an upper carbon fiber portion and a lower steel portion joined with a T-bracket. A third plot 209 represents a static position of both B-pillar assemblies prior to the side impact. X-axis 210 represents a horizontal displacement of the respective B-pillar assembly relative to the static position represented with plot 209. Y-axis 212 represents a vertical displacement of the B-pillar assemblies relative to the static position represented with plot 209. The plots illustrate a structural performance of the two B-pillar assemblies subjected to a side impact by measuring an extent of intrusion into a vehicle cabin proximate the B-pillar.

The graph 200 includes multiple regions for rating the displacement. For example, the graph 200 includes a good region 220, an acceptable region 222, a marginal region 224, and a poor region 226. A plot located in the good region 220 represents performance of a B-pillar assembly in which a driver is seventy percent less likely to be impacted from a side impact in comparison to a plot located in the poor region 226. A plot located in the acceptable region 222 is sixty-four percent less likely to be impacted in comparison to the poor region 226 and a plot in the marginal region 224 is forty-nine percent less likely to be impacted in comparison to the poor region 226.

In this example, the first plot 206 and the second plot 208 show substantially similar vertical and horizontal displacements. Plot 208 of the graph 200 supports a finding that the B-pillar assembly with the outer B-pillar including a carbon fiber component has substantially similar displacement characteristics to the B-pillar assembly with the all steel B-pillar outer. The carbon fiber portion of the B-pillar outer provides weight reduction while providing acceptable deformation characteristics when subjected to a side impact.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A B-pillar assembly for a vehicle comprising:
   a roof rail;
   a T-bracket including a first portion sized for securing to the roof rail and a second portion extending from the first portion to a location below a vehicle beltline;
   a B-pillar inner including a first end for securing to the second portion and a second end for securing to a rocker;
   a B-pillar inner reinforcement for mounting to the B-pillar inner; and
   a multi-component B-pillar outer including a carbon fiber portion and a steel portion mounted to the T-bracket, the roof rail, and the rocker such that the B-pillar inner reinforcement is disposed between the B-pillar inner and the B-pillar outer, and such that the steel portion of the B-pillar outer extends from the rocker to a location above the vehicle beltline,
   wherein the second portion of the T-bracket is secured to the steel portion of the B-pillar outer at the location below the vehicle beltline.

2. The assembly of claim 1, wherein the vehicle beltline extends fore and aft along the vehicle and through a substantially central region of the B-pillar assembly.

3. The assembly of claim 1, wherein the vehicle beltline is defined by an axis extending between a shotgun joint on a vehicle A-pillar and a latch reinforcement on a vehicle C-pillar.

4. The assembly of claim 1, wherein an upper portion and a lower portion of the B-pillar inner each define a first thickness and wherein a middle portion of the B-pillar inner defines a second thickness greater than the first thickness.

5. The assembly of claim 4, wherein the upper portion and the middle portion meet at a location adjacent the vehicle beltline.

6. The assembly of claim 1, wherein the B-pillar inner reinforcement includes an upper carbon fiber portion defining a first thickness and a lower carbon fiber portion defining a second thickness greater than the first thickness.

7. The assembly of claim 1, wherein the carbon fiber portion of the B-pillar outer is oriented between the roof rail and steel portion of the B-pillar outer to provide stiffness to the B-pillar assembly under a side impact.

8. A vehicle B-pillar assembly comprising:
   a T-bracket including an upper portion for securing to a vehicle roof rail and a lower portion extending perpendicular from the upper portion and below a vehicle beltline;
   a carbon fiber B-pillar inner secured to the T-bracket at one end and secured to a vehicle rocker at another end;
   a B-pillar reinforcement secured to the B-pillar inner;
   an upper B-pillar outer including an upper portion for securing to the upper portion of the T-bracket and a lower portion extending to a location above the vehicle beltline; and
   a lower B-pillar outer including an upper portion extending to the location above the vehicle beltline and secured to the lower portion of the T-bracket and further including a lower portion secured to the vehicle rocker,
   wherein the lower portion of the T-bracket and the lower B-pillar outer are steel and secured to one another to provide a steel reinforcement member spanning from the vehicle roof rail to the vehicle rocker, and wherein the lower portion of the T-bracket and the lower B-pillar outer are secured to one another at the location above the vehicle beltline.

9. The assembly of claim 8, wherein the vehicle beltline is defined by an axis extending between a shotgun joint on a vehicle A-pillar and a latch reinforcement on a vehicle C-pillar.

10. The assembly of claim 8, wherein the vehicle beltline extends fore and aft along the vehicle and through a substantially central region of the B-pillar assembly.

11. The assembly of claim 8, wherein the lower portion of the T-bracket and the lower B-pillar outer are arranged with one another for welding therebetween.

12. The assembly of claim 8, wherein the upper B-pillar outer defines a thickness between 3.7 mm and 4.1 mm.

13. The assembly of claim 8, wherein the lower portion of the T-bracket and the lower B-pillar outer define ductile hinging zones under a roof impact load and the upper B-pillar outer and the lower B-pillar inner define stiffness zones under a side impact load applied to the B-pillar assembly.

14. A vehicle B-pillar assembly comprising:
   a steel T-bracket including an upper portion secured to a roof rail and a lower portion extending perpendicular therefrom and below a beltline; and
   a B-pillar outer assembly including an upper carbon fiber portion extending from the roof rail to a location above the beltline and a lower steel portion extending from a vehicle rocker to the location above the beltline and secured to the lower portion of the T-bracket.

15. The assembly of claim 14, wherein the beltline is defined by an axis extending between a shotgun joint on a vehicle A-pillar and a latch reinforcement on a vehicle C-pillar.

16. The assembly of claim 14, wherein the beltline extends fore and aft along the vehicle and through a substantially central region of the B-pillar assembly.

17. The assembly of claim 14, wherein the lower portion of the T-bracket and the lower portion of the B-pillar outer are secured to one another at the location above the beltline.

18. The assembly of claim 14, wherein the upper carbon fiber portion defines a thickness between 3.7 mm and 4.1 mm.

19. The assembly of claim 14, wherein the lower portion of the T-bracket and the lower steel portion of the B-pillar outer assembly define ductile hinging zones under a roof impact load and the upper carbon fiber portion of the B-pillar outer assembly and a carbon fiber B-pillar inner define stiffness zones under a side impact load applied to the B-pillar assembly.

\* \* \* \* \*